Patented Nov. 26, 1929                                           1,737,039

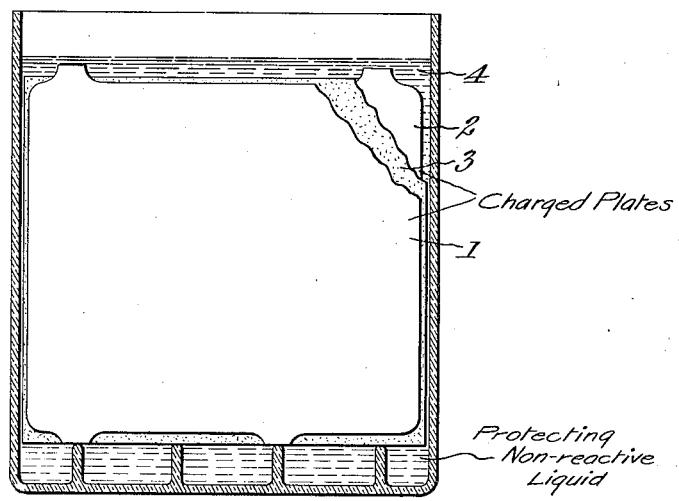

UNITED STATES PATENT OFFICE

RAYMOND C. BENNER, OF BAYSIDE, AND LEROY C. WERKING, OF NEW YORK, N. Y., ASSIGNORS, BY MESNE ASSIGNMENTS, TO PREST-O-LITE STORAGE BATTERY CORPORATION, A CORPORATION OF INDIANA

PRESERVICE PROTECTION OF STORAGE-BATTERY ELECTRODES

Application filed December 31, 1923, Serial No. 683,755. Renewed July 9, 1928.

This invention relates to improvements in methods and means for retaining storage battery electrodes in charged condition. A particular object of the invention is to provide for the storing of assembled wet electrode plates and separators, without substantial deterioration during the pre-service period.

Various prior methods have been devised in the attempt to obtain this result. It has been proposed, for example, to keep charged plates submerged in water until desired for use. As the plates can be washed free from acid only with difficulty, the water has ordinarily been in fact a dilute acid solution. This may react with the spongy lead active material, causing sulfation and other disadvantages.

Charged electrodes have also been dried in a vacuum, in an atmosphere of inert gas, or otherwise stabilized in dry form. The electrical response of dry electrode and separator assemblies, however, is not so rapid as that of similar assemblies which have been retained in wet condition. This appears to be chiefly due to the fact that the dry separators require considerable time to absorb electrolyte and reach satisfactory permeability. For these reasons, as well as because of the difficulties encountered in drying the plates and protecting them from the air, wet storage is preferable.

An important advantage of the present invention is the provision of a storage battery, comprising wet separators and electrodes substantially non-deteriorating during the pre-service period, which is capable of yielding a heavy current within a very short time after the addition of electrolyte.

We have discovered that retension of the charged condition may be simply and effectively secured by covering the plates with a protective, non-reactive material, preferably an aqueous liquid, such as water or dilute sulfuric acid, substantially saturated with lead sulfate. Such solutions do not react to a material extent with the active compositions. Batteries having charged plates immersed in a solution of this kind may be stored for long periods and will yield when put into service approximately the normal current obtainable from newly charged cells. While emphasis is placed upon the use of aqueous liquids saturated with lead sulfate, other protecting media are available, as will be clear from subsequent description.

The water used is preferably substantially freed from dissolved air. Sulfuric acid solutions of varying strength may be used. For example, acid of about 1 to 5% strength gives good results. The dissolving of the sulfate may be facilitated by very finely subdividing it.

The protective solution may be applied to the plates under any suitable conditions. It is generally most convenient, however, to assemble the plates and separators in the battery jar, charge the plates, remove the electrolyte, and then add the protecting solution. The assembly should be washed with water to remove the residual acid of the charging electrolyte before filling the jar with sulfate-saturated solution.

In the accompanying somewhat diagrammatic drawing, the single figure is a vertical section through a storage battery. Reference numerals 1 and 2 denote respectively charged positive and negative plates spaced by separators 3. The assembly is immersed in the protective medium 4. The drawing is merely illustrative of one application of the invention; various others are also advantageous.

After the battery jar has been filled with the protective liquid, it may be sealed in any suitable way. When perforated vent plugs, or the like, are used, the perforations may be filled with paraffin. Solid sealing plugs may be supplied and discarded for the regular perforated plugs when the battery is to be put into service. The two sets of plugs are preferably distinctively colored so as to prevent confusion.

To fit the battery for use, the vent plugs are removed, the protective lquid poured out and the battery allowed to drain, and electrolyte of the proper specific gravity is supplied. The vent plugs are then put in place. Care should be taken at all times to prevent unnecessary exposure of the negative active material to the air. The oxidation which is likely to result from such exposure is harmful. The pre-service seal should be sufficiently tight to prevent access of air in substantial amounts, as otherwise oxygen may be dissolved in the protective solution and may injure the active material.

The invention is not limited to water or dilute sulfuric acid saturated with lead sulfate as the protecting agent. Other substantially non-reactive liquids may be used under certain conditions, especially non-conductive liquids such as gasoline or other volatile organic compounds. Dilute sulfuric acid containing alcohol, or other substance capable of decreasing the solubility of lead sulfate may also be used to good advantage. Even pure water may be used with some success if it is freed from air and the acid is substantially removed from the battery plates and separators, as by thorough washing.

We claim:

1. Process of preparing storage battery electrodes for deferred use, comprising electrolytically charging the electrodes in a sulfuric acid solution, freeing the charged electrodes from at least the greater portion of the solution, and covering the active surfaces of the charged electrodes with a protecting liquid, said liquid including an additive comprising another liquid that is substantially non-reactive toward the electrode material.

2. Process of preparing storage batteries for deferrred use, comprising assembling electrodes and separators in a container, supplying electrolyte and charging the electrodes, removing the charging electrolyte, and replacing it with an aqueous liquid approximately saturated with lead sulfate, whereby deterioration is substantially prevented during the pre-service period.

3. A storage battery for deferred use, comprising assembled charged plates and separators immersed in a dilute solution of sulfuric acid approximately saturated with lead sulfate.

4. Process of preparing storage battery electrodes for deferred use, comprising charging the electrodes, providing a protective, substantially non-reactive liquid, and completely immersing said electrodes in said liquid.

5. Process of preparing storage battery electrodes for deferred use, comprising charging the electrodes, and completely immersing the electrodes in an aqueous liquid approximately saturated with a non-reactive substance.

6. Process of preparing storage battery electrodes for deferred use, comprising charging the electrodes, and completely immersing the electrodes in a dilute solution of sulphuric acid, approximately saturated with a non-reactive substance.

7. Process of preparing storage battery electrodes for deferred use, comprising charging the electrodes, and completely immersing the electrodes in a dilute solution of sulphuric acid approximately saturated with lead sulphate.

In testimony whereof, we affix our signatures.

RAYMOND C. BENNER.
LEROY C. WERKING.